United States Patent
Dold et al.

(10) Patent No.: US 9,581,990 B2
(45) Date of Patent: Feb. 28, 2017

(54) METHOD FOR THE PROGRAMMING OF A SAFETY CONTROLLER

(75) Inventors: Franz Josef Dold, Furtwangen (DE); Klaus Weddingfeld, Waldkirch (DE)

(73) Assignee: SICK AG, Waldkirch/Breisgau (DE)

( * ) Notice: Subject to any disclaimer, the term of this patent is extended or adjusted under 35 U.S.C. 154(b) by 2339 days.

(21) Appl. No.: 12/216,320

(22) Filed: Jul. 2, 2008

(65) Prior Publication Data

US 2009/0030534 A1 Jan. 29, 2009

(30) Foreign Application Priority Data

Jul. 5, 2007 (EP) .................... 07013210

(51) Int. Cl.
*G05B 19/00* (2006.01)
*G05B 19/05* (2006.01)
*G05B 19/042* (2006.01)

(52) U.S. Cl.
CPC ......... *G05B 19/056* (2013.01); *G05B 19/0426* (2013.01); *G05B 2219/13144* (2013.01); *G05B 2219/23258* (2013.01)

(58) Field of Classification Search
CPC .............. G05B 19/0426; G05B 19/056; G05B 2219/23258; G05B 2219/13144
USPC .............................................. 700/110, 27, 83
See application file for complete search history.

(56) References Cited

U.S. PATENT DOCUMENTS

| | | | | |
|---|---|---|---|---|
| 5,168,441 A * | 12/1992 | Onarheim et al. | ............... | 700/17 |
| 5,812,394 A * | 9/1998 | Lewis et al. | .................... | 700/17 |
| 6,549,034 B1 * | 4/2003 | Pietrzyk et al. | ................ | 326/38 |
| 6,556,950 B1 * | 4/2003 | Schwenke et al. | ........... | 702/183 |
| 6,571,358 B1 * | 5/2003 | Culotta et al. | ................... | 714/33 |
| 6,735,764 B2 * | 5/2004 | Nakai | ........................... | 717/156 |
| 6,778,079 B2 * | 8/2004 | Weber | .......................... | 340/500 |
| 6,990,393 B2 * | 1/2006 | Parker | .......................... | 700/282 |
| 7,367,028 B2 * | 4/2008 | Kodosky et al. | ............. | 717/177 |
| 7,505,817 B2 * | 3/2009 | McDaniel et al. | .............. | 700/18 |
| 7,536,590 B2 * | 5/2009 | Okeda et al. | .................... | 714/11 |
| 7,571,390 B2 * | 8/2009 | Langkafel et al. | ........... | 715/763 |
| 7,613,593 B2 * | 11/2009 | Mikk | ................................ | 703/1 |
| 8,185,833 B2 * | 5/2012 | Kodosky et al. | ............. | 715/763 |
| 2001/0056306 A1 | 12/2001 | Nakai et al. | | |
| 2003/0033037 A1 * | 2/2003 | Yuen et al. | ..................... | 700/86 |
| 2003/0058602 A1 * | 3/2003 | Veil | ............................... | 361/166 |
| 2003/0058623 A1 * | 3/2003 | Veil et al. | ..................... | 361/728 |

(Continued)

FOREIGN PATENT DOCUMENTS

DE 10 2008 060 003 A1 5/2010
EP 1 362 269 B1 2/2005
(Continued)

OTHER PUBLICATIONS

SICK, "industrial safety systems", 2005, pp. 1-32.*
(Continued)

*Primary Examiner* — Kenneth M Lo
*Assistant Examiner* — Olvin Lopez Alvarez
(74) *Attorney, Agent, or Firm* — Nath, Goldberg & Meyer; Jerald L. Meyer

(57) ABSTRACT

The invention relates to a method for the programming of a safety controller to be interconnected with encoders and actuators, wherein a wiring plan or a specific wiring is first prepared, whereupon an automated programming of the safety controller takes place using the wiring information.

18 Claims, 4 Drawing Sheets

(56) References Cited

U.S. PATENT DOCUMENTS

Figure 1:
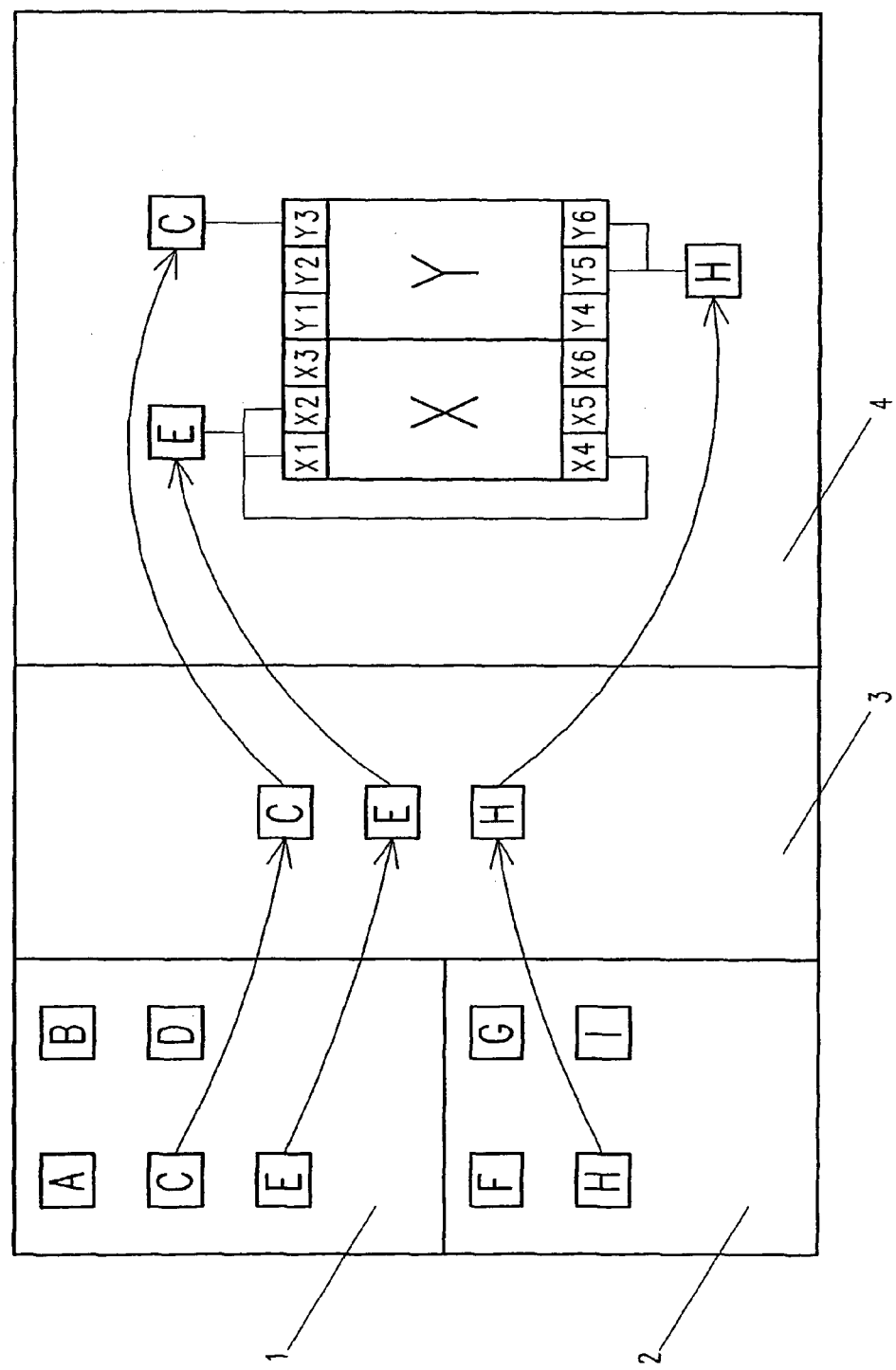

| | | | |
|---|---|---|---|
| 2004/0064205 A1* | 4/2004 | Kloper et al. | 700/86 |
| 2005/0108444 A1* | 5/2005 | Flauaus et al. | 710/15 |
| 2005/0228517 A1* | 10/2005 | Tomita | 700/87 |
| 2006/0190105 A1 | 8/2006 | Hsu et al. | |
| 2007/0168065 A1* | 7/2007 | Nixon et al. | 700/97 |
| 2010/0168874 A1* | 7/2010 | Lucas et al. | 700/17 |
| 2011/0230983 A1* | 9/2011 | Koepcke et al. | 700/86 |

FOREIGN PATENT DOCUMENTS

| | | | | |
|---|---|---|---|---|
| EP | 2 098 926 A1 | | 9/2009 | |
| EP | 2098924 | * | 9/2009 | G05B 19/042 |
| EP | 2098925 | * | 9/2009 | G05B 19/042 |
| EP | 2098928 | * | 9/2009 | G05B 19/042 |
| EP | 2 246 756 A1 | | 11/2010 | |
| EP | 2 343 611 A1 | | 7/2011 | |
| WO | 9844399 A2 | | 10/1998 | |
| WO | WO 02/067065 A2 | | 8/2002 | |

OTHER PUBLICATIONS

Siemens, "SIMATIC PCS7", Apr. 2005, pp. 50.*
SICK, "UE4400 Flexible Saftey Automation Safety plus", Oct. 2006, pp. 12.*
Federal Register, "Notices", Feb. 2011, vol. 76. No. 27, pp. 7162-7175.*
SICK, "Industrial SAfety Systems, Intelliface", Nov. 2004, pp. 34.*
SICK, "SICK DeviceNet Safety Configurator," Sep. 2005, pp. 1-156.*
USPTO Trademarks Office, "Intelliface", Jan. 15, 2003, pp. 1.*
USPTO Trademarks Office, "SAfety Plus trademark", Jun. 24, 2008, pp. 2.*
USPTO Trademarks Office, "AS-Interface", Nov. u26, 1996, pp. 2.*
SICK, "SICK Intelliface Flexi Controllers Quick start Guide" Oct. 18, 2006, pp. 22.*
SICK, "Flexi configurator—Operating Instructions", Aug. 16, 2007, pp. 1-10.*
SICK, "Configuration Software Flexi Soft Designer, version 1.3.0", Apr. 6, 2011, pp. 18.*
Machinebuiliding.net, "Flexi Soft Designer v1.3 links up to four controllers over 100m", Jul. 30, 2010, pp. 2.*
SICK, "Software and Downloads", downloaded Apr. 24, 2013, pp. 2.*
SICK, "UE410 Flexi Modular safety Controller" , Jun. 22, 2006, pp. 20.*
European Search Report, Application No. 07 013 210.5, dated Dec. 19, 2007.
European Patent Office, Official Letter, Application No. 07 013 210.5, dated Feb. 3, 2010.
European Patent Office, Official Letter, Application No. 07 013 210.5, dated Apr. 7, 2010.
Reply Letter, Application No. 07 013 210.5, dated May 18, 2010.
Formal letter from the German Federal Patent Court and translation; dated Apr. 6, 2016; pp. 2.

* cited by examiner

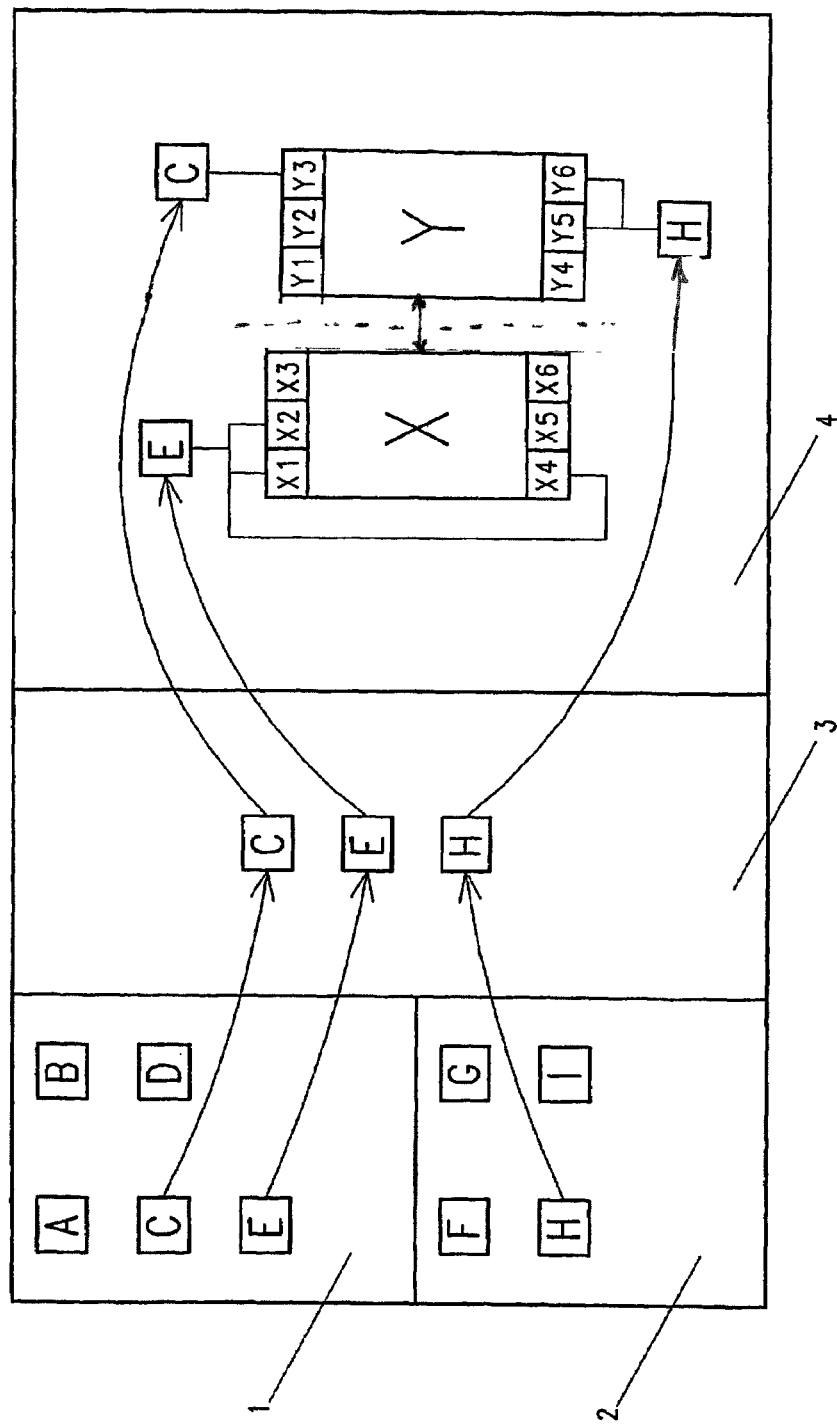

METHOD FOR THE PROGRAMMING OF A SAFETY CONTROLLER

The invention relates to a method for the programming of a safety controller to be interconnected with encoders and actuators.

A method of this type is known from EP 1 362 269 B1. In this known method, program modules respectively required within the framework of a programming procedure are selected and compiled to form a program which is suitable for the operation of a safety controller. To increase the clarity in the programming and to avoid programming errors, the selectable program modules are shown on a programming interface and are associated, for example by means of drag and drop, with one of three function groups, with each function group corresponding to a specific screen region of the programming interface. The first function group is associated in this connection with an input evaluation, the second is associated with a logic processing and the third with an output control.

Programming errors are in particular reduced in accordance with the prior art in that program modules which are suitable for the evaluation of inputs can only be associated with the input evaluation function group; program modules which are suitable for the logic processing can only be associated with the logic processing function group; and program modules which are suitable for the control of outputs can only be associated with the output control function group so that erroneous associations are avoided here.

The fact is disadvantageous in the known method that a separate program module has to be selected and associated even for the realization of very simple functions for the evaluation of every single input of the safety controller, with this applying in the same way to the control of every single output. The total program is thus frequently not clear due to the high number of program modules to be selected. All the selected program modules can in particular no longer be shown on a single screen page of the programming interface in the realization of complex functions.

In addition, only the structure of the program to be prepared is illustrated to the programmer in accordance with the prior art within the framework of the programming interface, with no information being communicated to him with respect to the wiring between the safety controller, on the one hand, and the encoders and actuators, on the other hand.

In addition, the known method can only be applied with difficulty when safety controllers have to be programmed which have different components which, for example, communicate with one another via networks, since the programming surface is not suitable to inform the programmer of the physical position at which a specific input or a specific output of the safety controller is located in the total system.

It is an object of the invention to provide a method of the initially named kind which configures and/or prepares the respective desired program, on the one hand, but simultaneously delivers information with respect to the wiring to be made of the safety controller, encoders and actuators, on the other hand. In this connection, in particular the configuration and/or preparation of the program should be made possible in a simple and clear manner so that errors are precluded to a very large extent. Finally, it should preferably also be made possible to provide programs for safety controllers which consist of a plurality of program parts arranged in a decentralized manner without the clarity during the configuration and/or preparation of the program suffering thereunder.

In accordance with the invention, this object is satisfied in accordance with a first variant in that first a wiring plan is prepared in that
the safety controller is shown with its connection terminals at least schematically on a graphic programming interface;
the encoders and actuators are selected with reference to encoder symbols and actuator symbols; and
wiring symbols are shown on the programming interface which connect the encoder symbols and actuator symbols to the connection terminals associated with them,
whereupon a program is configured and/or prepared in that
program parts are automatically activated and/or compiled which are provided for the evaluation of the selected encoders and for the control of the selected actuators; and
parameters are automatically associated with these program parts which correspond to those connection terminals with which the respective encoder symbols and actuator symbols are associated.

In contrast to the prior art, only one wiring plan is prepared in a first step in accordance with the invention using a graphic programming interface, said wiring plan indicating which connection terminals of the safety controller should be wired with which encoders and actuators. It is already known on the basis of this wiring plan which encoders and actuators are used for the respective application so that in a second step after the preparation of the wiring plan those program parts can be programmed automatically by means of the method in accordance with the invention which are provided to evaluate the selected encoders and to control the selected actuators. It is also furthermore already known on the basis of the wiring made which specific connection terminals the selected encoders and actuators are to be connected to so that parameters can automatically be set in the named program parts which correspond to the respective connection terminals.

It is therefore already possible in accordance with the invention with knowledge of the wiring plan to program parts in a completely automated manner and also to parameterize them with respect to the selected connection terminals such that that program area which is responsible for the evaluation of the encoders and for the control of the actuators is programmed practically fully automatically. It is then still possible only in a further step to determine in a suitable manner how evaluated encoder signals should be logically linked to one another and with which actuators the linking results should be associated (logic programming).

It is therefore achieved within the framework of the invention that essential parts of the program are programmed for the operation of the safety controller solely by the graphically assisted preparation of a wiring plan without the programmer having to carry out additional steps for this purpose. On the one hand, this results in a substantially increased economy of the total method; on the other hand, it is achieved by the named automation that an error-free generation of the program parts prepared in an automated manner is ensured.

Unlike the document on the prior art initially quoted, both the preparation of a program and the configuring of a program are meant by the term "programming" within the framework of the invention. On the preparation of a program, different prefabricated program parts are, for example, compiled to form a program; on the configuration of a program, it is determined, by the setting of parameters, for example, which branches of a program previously already prepared are to be activated or worked through. The term "programming" in this sense of this invention also includes a combination of preparing and configuring a program. Furthermore, programming is not necessarily to be understood as the complete preparation of an executable program for the operation of a safety controller; the only partial preparation or configuration of such a program is rather also covered by it.

Program parts in accordance with the invention which are responsible for the evaluation of the selected encoders, for example, take over the conversion of a two-channel (ambivalent or equivalent) signal delivered by the encoder into a single signal or a conversion of an analog signal into a digital signal which can then be further processed within the framework of a logic link. Such program parts can equally e.g. evaluate test signals delivered by encoders or can ensure that suitable test signals are sent to an encoder.

Program parts which are responsible for the control of the selected actuators can, for example, convert individual signals delivered from a logic link or from a control input into two-channel (ambivalent or equivalent) signals which are to be output via two output terminals of the safety controller. An adaptation of the electrical signal properties can e.g. equally be carried out or a conversion of a digital signal into an analog signal can take place.

It is particularly preferred within the framework of the invention for the relative positions of the connection terminals shown on the graphic programming interface to correspond to their actual physical relative positions. It is advantageous in this respect for a complete physical model of the safety controller with its connection terminals to be shown on the graphic programming interface. It is achieved by these measures that the programmer already becomes aware in a very illustrative manner in the preparation of the wiring plan which respective connection terminals are to be contacted since the connection terminals visible on the programming interface are arranged in exactly the same way as they are attached to the objectively and physically present safety controller.

The programming procedure in accordance with the invention, which is basically limited to the preparation of the wiring plan for the programmer, can be carried out on any desired programming devices. The use of PCs, laptops or handhelds is possible, for example.

The programming procedure can be carried out in a particularly clear manner if a set of available encoder symbols and/or actuator symbols is shown on the programming interface and if those encoder symbols and/or actuator symbols are selected from this set which correspond to the respective required encoders and actuators. Such a choice can take place, for example, by means of drag and drop or by means of a pull-down menu. After the selection, the symbols are then dragged into the region of those connection terminals of the safety controller shown on the programming interface to which corresponding encoders/actuators should be connected. Subsequently, after a selection or positioning of the encoder symbols and/or actuator symbols has been made, the respective required wiring between the encoders and/or actuators, on the one hand, and the safety controller, on the other hand, can automatically be shown on the programming interface. Such a wiring is usually visualized by means of simple linear wiring symbols. However, any other desired visualization possibilities are also conceivable as long as it is ensured that the programmer can see which connection terminals of the safety controller have to be electrically contacted with which encoders or actuators.

The connection terminals of the safety controller shown on the programming interface can all be provided at a single control component accommodated in a single housing. It is, however, also possible that the shown connection terminals of the safety controller are associated with a plurality of physically mutually separate units or modules. Such separate units are then preferably mutually connected in a communicating manner, with such a connection, for example, being able to be realized by means of a field bus or of a backplane (a board with different slots). Physically mutually separate units which, however, are connected to one another in a communicating manner, can take over any desired tasks, with the units of the safety controller not necessarily having to take over actively intelligent control tasks. It is, for example, possible to provide separate units which only provide physical inputs and outputs of the safety controller.

It is particularly advantageous if, after the preparation of the wiring plan, this plan is printed out or displayed, with all the connection terminals of the safety controller, encoders and actuators each being shown on the plan in accordance with their physical arrangement, including the selected connections of these connection terminals. It is of advantage for the connection terminals additionally to be provided on the wiring plan with their respective name or marking physically present on the device. Based on the named plan, the skilled person is then able to make a complete and correct wiring of the safety controller, encoders and actuators without any further information, with this also in particular applying when the safety controller consists of a plurality of decentralized components which are then likewise accordingly shown separate from one another on the plan.

In accordance with a second variant of the invention, the initially named object is satisfied in that first a physical wiring of the connection terminals of the safety controller with the respective required encoders and actuators is made, whereupon it is recognized by a programming device which encoders and actuators have been wired and, subsequently, a program is configured or prepared in that program parts are automatically activated or compiled which are provided for the evaluation of the wired encoders and for the control of the wired actuators, with parameters automatically being associated with these programming parts which correspond to those connection terminals to which the respective encoders and actuators are connected.

Unlike the first variant, instead of the preparation of a wiring plan, the physical wiring of the connection terminals of the safety controller with the respective required encoders and actuators is made here, which is in particular suitable when comparatively few components have to be wired with one another.

The wiring made and the connected encoders and actuators are then automatically recognized by a programming device so that information is available to the programming device as to which encoders and which actuators are contacted with which connection terminals of the safety controller. The programming device can be an external programming device, for example a PC, laptop or handheld; however, it is equally possible to form the safety controller itself or a part of the safety controller as a programming device.

A program is subsequently configured or prepared by the programming device with knowledge of the wiring made and of the connected encoders and actuators, with this being done in the same manner as in the first variant in accordance with the invention. Program parts are therefore automatically activated or compiled which are provided for the evaluation of the already wired encoders and for the control of the already wired actuators, with parameters automatically being associated with these program parts which correspond to those connection terminals of the safety controller which are connected to the already wired encoders and actuators.

The wiring is therefore first made theoretically by means of a suitable programming device using the first variant in accordance with the invention such that all the used connection terminals of the safety controller, encoders and actuators are anyway known to the programming device. In accordance with the second invention variant, in contrast, the wiring is made specifically physically, whereupon the programming device can then independently recognize this wiring. The respective subsequent programming then takes place in a comparable or identical manner in both invention variants.

The embodiments of the methods in accordance with the invention described in the following can be applied to both invention variants.

It is particularly preferred for an element description which is specific to an encoder or to an actuator and which defines properties of the respective encoder or actuator to be associated with each encoder and each actuator in the form of a data set. Within the framework of such an element description in the form of a data set, it can, for example, be laid down that a specific encoder is an emergency off button which delivers ambivalent signals on two separate channels and has to be supplied with a test signal. If the programming device is aware of such an element description of a selected encoder in a manner in accordance with the invention, it can be ensured during the programming procedure that the corresponding encoder can only be connected to respective suitable input terminals of the safety controller. An erroneous connection cannot be allowed right from the start by the programming device or a warning signal can be output after a defective connection.

The element description can, however, furthermore also serve to carry out the actual programming procedure. It is namely generally known due to the element description which functions a program part has to be carry out which is responsible for the evaluation of a respective encoder or for the control of a respective actuator. Accordingly, for example in dependence on the element description, a specific program part can be activated or added to the program to be prepared, said program part having the respective required functions for the evaluation of a respective encoder or for the control of a respective actuator. It is, however, equally possible that parameters are derived from the element description which only configure a suitable program part already present in the program to be prepared such that it is suitable to evaluate the respective encoder or control the respective actuator. If, in the last-named case, for example, a program part is suitable both for a single-channel evaluation and for a two-channel evaluation, it can be determined by means of a parameter derived from the element description whether this program part should carry out a single-channel evaluation or a two-channel evaluation in the specific application.

Based on the element description, the wiring made can therefore be checked, on the one hand; on the other and, the respective required program parts can also be selected, activated or configured, on the other hand. Parameters can as a consequence then be associated with such program parts by the programming device in an automated manner which correspond to those connection terminals of the safety controller to which the respective encoder or actuator is connected. This is necessary since the program parts activated or configured on the basis of the element description are admittedly generally suitable to carry out the functions required for the respective encoder or actuator, with it, however, not yet being known on the basis of the element description alone which specific connection terminals of the safety controller the respective encoders or actuators were connected to. This information is, however, —as already mentioned—present in the programming device due to the wiring plan or the already made wiring so that the programming device can associate corresponding parameters with the activated or configured program parts. It is ensured in this manner that the correct inputs of the safety controller are evaluated and the correct outputs of the safety controller are controlled.

The element descriptions can already be deposited or stored in the programming device at the start of the method in accordance with the invention. Alternatively, however, it is also possible for the element descriptions to be stored in the corresponding encoders and actuators from where they are transmitted into the programming device in a wired or wireless manner for the purpose of programming. The programming device can in turn be an external device, for example a PC, laptop or handheld. It is, however, additionally also possible to make the safety controller itself as a programming device. In the last-named case, it is then possible while applying the second variant in accordance with the invention that the safety controller practically programs itself solely due to the connection of the respective required encoders and actuators, at least as far as regards the evaluation of the inputs and the control of the outputs.

The element description of the encoders can at least include one of the encoder-specific pieces of information named in the following:
Number of the channels to be evaluated;
Demands on the input terminals of the safety controller to be connected;
Type of the evaluation (equivalent/ambivalent);
Test configuration;
Present connection terminals;
Physical arrangement of the connection terminals;
Encoder marking.

If the element description includes information on the number of channels to be evaluated, an erroneous wiring can—as already explained—already be precluded by the programming device since, for example with two channels to be evaluated, an error message can be generated if only one channel is connected. The same applies accordingly if the element description includes information on the demands on the input terminals of the safety controller to be connected. An error message can, for example, be output by the programming device on the basis of this information if an analog encoder is connected to a digital input of the safety controller.

The information "test configuration" optionally present in the element description can determine with how many and/or with which output connection terminals of the safety controller the encoder is to be wired. Such an element description is generally associated with an encoder which has to be supplied with at least one test signal by the safety controller so that such an encoder is not only to be wired with at least one input connection terminal of the safety controller, but also with at least one output connection terminal of the safety controller.

The element description of the actuators can include at least one piece of the actuator-specific information named in the following:
Number of the channels to be evaluated;

Demands on the output terminals of the safety controller to be connected;
Type of the control (equivalent/ambivalent);
Present connection terminals;
Physical arrangement of the connection terminals;
Actuator marking.

The information contained in the element description of the encoder or actuator with respect to the present connection terminals and/or to the physical arrangement of these connection terminals serves also to be able to print out a complete wiring plan after the preparation of the wiring plan which not only shows the safety controller, but also all the selected encoders and actuators with their respective connection terminals. In addition, it is also possible for specific applications for the programmer to select specific connection terminals of encoders and actuators in the wiring of encoders and actuators with the safety controller, provided that a plurality of possibilities are available here. In addition, all the connection terminals of the encoders and actuators can be provided in the wiring plan with their respective name or marking physically present at the device, provided these names and markings form part of the connection terminal information of the element description.

The information "demands on the input or output terminals of the safety controller to be connected" optionally present in the element description of the encoders and actuators can relate both to electrical demands and to physical demands. Electrical demands e.g. define whether digital or analog signals are transmitted or with which flows, voltages, capacities, etc. the respective terminals have to be compatible to be able to communicate with the respective encoders or actuators. Physical properties can e.g. define wire cross-sections or plug types of the encoder cables or actuator cables.

The information "encoder marking" or "actuator marking" optionally present in the element description of encoders and actuators can be amended in a desired manner by the programmer such that a respective suitable verbal description of the encoders and actuators can be selected here.

Within the framework of the invention, element descriptions cannot only be associated with the encoders and actuator; it is rather also possible that a module-specific element description which defines properties of the respective module is associated with at least one module, preferably with each module, of the safety controller in the form of a data set. Such an element description can serve to check whether a module wired with specific encoders or actuators also has the properties to evaluate the respective encoders or to control the respective actuators. If this is not the case, an error message can in turn be output within the framework of the programming procedure. In addition, such an element description can include information on all the present connection terminals and/or on the physical arrangement of the connection terminals of a module.

In a preferred embodiment, a specific configuration of an encoder or of an actuator can also be carried out based on the element description of a module. If, for example, an input connection terminal of a module requests a test signal having specific test pulses from an encoder and if the encoder can deliver different test pulses, it is possible to configure the encoder by the programming device such that it delivers the test pulses requested by the input connection terminal of the module.

Based on the wiring plan in accordance with the invention (1st invention variant) or on the physical wiring recognized by the programming device (2nd invention variant) and all the present element descriptions, complete information with respect to the specific total system is available in the programming device and can in particular be exploited very advantageously in the logic programming following the method in accordance with the invention. It is determined within the framework of the logic programming which of the evaluated encoder signals should be logically linked with one another in which manner and with which actuators the link results are to be associated. Due to the known complete information, it is known in the logic programming which connection terminals of the safety controller are connected to which encoders and actuators and which properties the corresponding input and output signals of the safety controller have. The logic programming made can thus automatically be checked for plausibility without problem, whereby incorrect programming procedures are effectively prevented.

The program tool for the carrying out of the programming in accordance with the invention can preferably be deposited in a memory of the safety controller and can be loaded into a programming device before the start of the programming. PCs, laptops or handhelds can also be used as the programming device in this case, for example. The loading of the programming tools from the safety controller into a programming device advantageously makes it possible that no separate installation of the programming tool on the programming device is necessary before carrying out the programming since the programming device can independently load the programming tool on the connection of the safety controller.

A third variant of the invention relates to a method for the programming of a safety controller to be interconnected with encoders and actuators, said method being characterized in that
application symbols for different complete applications of the safety controller are shown on a graphic programming interface; and
in that an application symbol is selected, with an application description being associated with the symbol in the form of a data set, said application description defining
  properties of the safety controller, including the logic links to be made between the encoder signals and the association of the link results with actuators (logic programming);
  properties of the encoders and/or actuators to be connected for the respective application; and
  the wiring to be made between the safety controller, the encoders and/or actuators,
whereupon a program is configured and/or prepared for the operation of the respective complete application in dependence on the application description.

In accordance with this variant of the invention, the user only has to select a complete application, whereupon the total programming procedure runs fully automatically in dependence on the named application description. Since it is also defined within the framework of the application description which wirings are to be made between the safety controller, the encoders and/or actuators, where required, after the selection of an application symbol, a wiring plan can be printed out without problem based on which the user can then make the wiring.

An example for a complete application of the named kind is, for example, an application "machine protection" which includes an emergency off button, a light grid and a reset button as well as a relay as an actuator in addition to a safety controller as an encoder. Within the framework of the application description "machine protection", it can then already be defined by the logic programming that the relay only transmits a machine operation signal when signals are transmitted both by the emergency off button and by the light grid which indicate that the emergency off button was not actuated and that the light grid was not interrupted. If one of these two conditions is not satisfied, the relay outputs a machine stop signal. After the output of such a machine stop signal, a machine operation signal can only be output by the relay again if the reset button was previously actuated.

In addition to the described logic programming, the application description "machine protection" also includes a description of the three encoders to be connected and of the one actuator to be connected as well as the wiring to be made between all the named components.

Further preferred embodiments of the invention are explained in the dependent claims.

Figure 2:
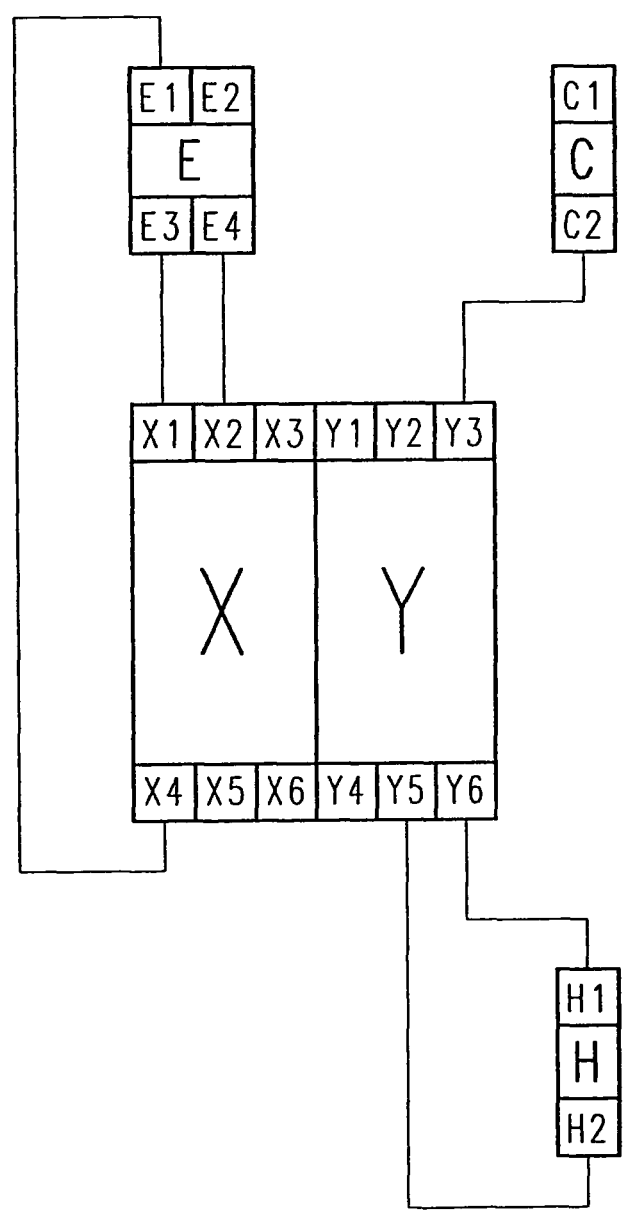
Figure 3:
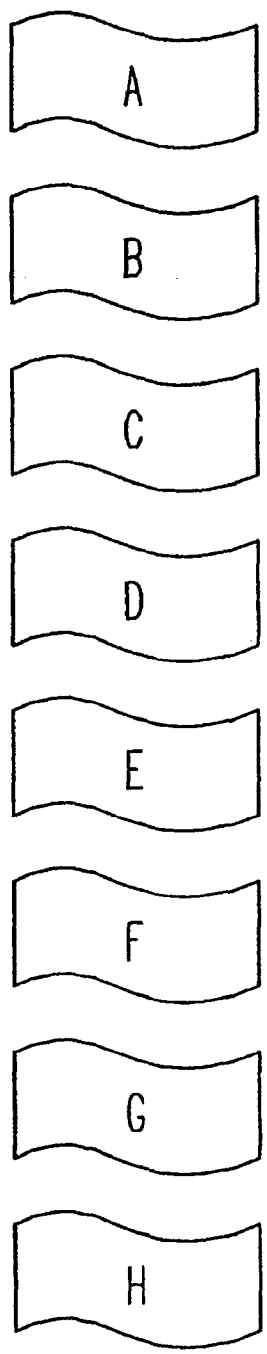
Figure 4:
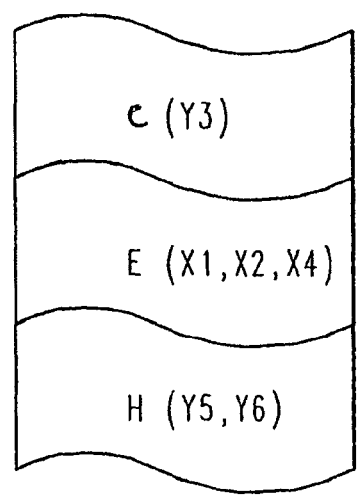

The invention will be described in more detail in the following with reference to embodiments and to the drawings; there are shown in these:

FIG. 1 a schematic view of a programming interface in accordance with the invention;

FIG. 2 a printed out wiring plan in accordance with the invention;

FIG. 3 a library of program parts which can be used in accordance with the invention;

FIG. 4 a program prepared in accordance with the invention; and

FIG. 5 a schematic view of an exemplary programming interface having plurality of units physically separate from one another on a safety controller.

The left hand area of the screen in accordance with FIG. 1 is divided into an upper area 1 and a lower area 2, with five encoder symbols A to E being shown in the upper area 1 and four actuator symbols F to I being shown in the lower area 2. A selection field 3 into which encoder symbols and actuator symbols can be dragged from the areas 1 and 2 by means of drag and drop adjoins the areas 1 and 2 at the right. Encoder symbols and actuator symbols are then available for a wiring in the selection area 3.

In the right hand screen area 4, a safety controller consisting of two modules X and Y is shown, with the module X having six connection terminals X1 to X6 and the module Y likewise having six connection terminals Y1 to Y6. The modules X, Y of the safety controller can also be selected by means of a suitable method and positioned in the screen area 4 so that safety controllers made up of any desired different modules can basically be compiled.

In the embodiment shown in FIG. 1, the encoder symbols C and E as well as the actuator symbol H were selected from the areas 1 and 2 and dragged into the selection area 3 by means of drag and drop. The encoder symbol C is then dragged by means of drag and drop from the selection field 3 into the area of the connection terminal Y3 of the module Y, whereupon a wiring symbol in the form of a line is shown between the encoder symbol C and the connection terminal Y3. In this respect, an element description is associated with the encoder symbol C which indicates that it is a single-channel switch in this case which can be connected to any desired digital input of a safety controller. Within the framework of the programming in accordance with the invention, a check is then made whether the selected connection terminal Y3 is a digital input. If this is the case, a corresponding wiring is permitted and the named wiring symbol is shown between the encoder symbol C and the connection terminal Y3.

Subsequently, the encoder symbol E is then dragged by means of drag and drop from the selection field 3 into the area of the connection terminals X1, X2 of the module X and is positioned there. An element description is deposited for the encoder symbol E which indicates that it is a two-channel tested switch here. Accordingly, a check is automatically made in accordance with the invention on the positioning of the encoder symbol E whether the connection terminals X1 and X2 of the module X are suitable inputs. Furthermore, the output X4 of the module X is automatically selected as a test output which is then likewise wired with the encoder symbol E. A permitted wiring of the encoder symbol E thus ultimately results with the two inputs X1 and X2 as well as with the output X4 of the module X.

Finally, the actuator symbol H which relates to a two-channel relay in accordance with its element description is dragged into the area of the outputs Y5, Y6 of the module Y. A check is in turn made here whether the connection terminals Y5 and Y6 are suitable outputs, whereupon, on a positively concluded test, wiring symbols are shown between the actuator symbol H and the connection terminals Y5, Y6 of the module Y.

To be able make a respective check in the previously explained method steps whether the inputs and outputs X1, X2, X4, Y3, Y5 and Y6 are respective inputs and outputs suitable for the selected wiring, a respective element description known to the programmer is also deposited for the modules X and Y of the safety controller, said element description specifying all the inputs and outputs of the modules X and Y.

Once the preparation of the wiring plan has been completed by the method steps explained above, it can be printed out on the basis of the information generated in the programming device, with the form of the wiring plan being able to correspond to the presentation in accordance with FIG. 2.

Unlike the screen area 4 in accordance with FIG. 1, in the wiring plan in accordance with FIG. 2, the encoders C and E and also the actuator H are each shown with their physically present connection terminals so that it is additionally made clear to the user which connection terminals of the encoders C, E and of the actuator H each have to be connected to the selected connection terminals of the modules X and Y. The selection of the specific connection terminals of the encoders C, E and of the actuator H in turn takes place with reference to the element descriptions deposited for the encoder symbols C and E and the actuator symbol H. These element descriptions namely specify the function of all the connection terminals of the encoders C and E and of the actuator H.

Based on the wiring made in accordance with FIG. 1, a complete wiring plan is therefore available to the user with the printout in accordance with FIG. 2 on the basis of which all the required components C, E, H, X and Y can be wired to one another.

In accordance with the invention, that program part of a program is now also immediately prepared from the information input into the programming device in accordance with FIG. 1 for the operation of the safety controller X, Y which is responsible for the evaluation of the signals of the encoders C, E and for the control of the actuator H.

For this purpose, there is a library of programming parts in accordance with FIG. 3 in the programming device, with a respective program part A to I being associated with each encoder symbol A to E and with each actuator symbol F in accordance with FIG. 1. By moving the symbols C, E and H into the selection field 3 in accordance with FIG. 1, the programming device can already compile the program parts C, E and H present in the library in accordance with FIG. 3 to form a program part in accordance with FIG. 4. Such a program part in accordance with FIG. 4 is then generally able to evaluate the signals of the encoders C and E and to evaluate the actuator H. However, after a movement of the symbols C, E and H into the selection field 3, it is still not clear which connection terminals of the safety controller X, Y specifically have, to be evaluated or controlled.

This is then, however, defined by the wiring made in the screen area 4 in accordance with FIG. 1. It is clear on the basis of this wiring that the program part C in accordance with FIG. 4 has to evaluate the input Y3 of the module Y so that the input parameter Y3 can be associated in an automated manner with the program part C by the programming device. In a corresponding manner, the input parameters X1 and 2 as well as the output parameter X4 are associated with the program part E. An association of the output parameters Y5 and Y6 takes place with respect to the program part H.

In an alternative embodiment of the invention, separate program parts are not present for each symbol A to 1 in the program library in accordance with FIG. 3, but program parts are rather provided which can be associated with a plurality of different symbols. For example, the program parts A, B can be combined to form a single program part AB which can evaluate both a single-channel switch A and a two-channel switch B. If then the two-channel switch B is wired with the safety controller, the programming device selects the program part AB in an automated manner and configures it by means of suitable parameters such that it is suitable for the evaluation of a two-channel switch. Alternatively, on the wiring of the single-channel switch A, a configuration can take place such that the program part AB is suitable for the evaluation of a single-channel switch.

The method described above in conjunction with FIGS. 1 to 4 corresponds to the first variant of the invention. If instead the second variant of the invention is selected, the selection and association of encoder symbols and actuator symbols in accordance with FIG. 1 is dispensed with since instead the direct physical wiring of the encoders and actuators with the safety controller is made. The automatic recognition of the wiring made then takes place by the programming device, which means that it is recognized which connection terminals of the wired encoders and actuators are connected to which connection terminals of the safety controller. Subsequent to this recognition process, the preparation or configuration of a program can equally take place as was described above in connection with FIGS. 3 and 4.

In the second variant of the invention, the printing out of the wiring plan in accordance with FIG. 2 could be dispensed with since the wiring is already physically present. On the other hand, the printing out of a wiring plan is also possible without problem in this variant based on the previously carried out automatic recognition of the wiring made, which is in particular sensible for documentation purposes.

The invention claimed is:

1. A method for the programming of a safety controller to be interconnected with encoders and actuators, comprising the steps of:
preparing a wiring plan wherein the safety controller is shown with its connection terminals at least schematically on a graphic programming interface, said wiring plan preparation comprising:
selecting the encoders and actuators with reference to encoder symbols and actuator symbols; and
showing wiring symbols on the programming interface which connect connection terminals of the encoder symbols and connection terminals of the actuator symbols to the connection terminals of the safety controller;
configuring or preparing a program such that program parts are automatically activated or compiled which are provided for the evaluation of the selected encoders and for the control of the selected actuators; and
automatically associating parameters with these program parts which correspond to the connection terminals with which the respective encoder symbols and actuator symbols are associated.

2. A method in accordance with claim 1, wherein relative positions of each of the connection terminals shown on the graphic programming interface correspond to actual physical relative positions of each of the connection terminals.

3. A method in accordance with claim 1, wherein a physical model of the safety controller and the connection terminals of the safety controller is shown on the graphic programming interface.

4. A method in accordance with claim 1, wherein:
a set of available encoder symbols and actuator symbols is shown on the programming interface; and
at least one encoder symbol and at least one actuator symbol is selected from the set.

5. A method in accordance with claim 1, wherein the wiring symbols are automatically shown on the programming interface after selection of the encoder symbols and actuator symbols has taken place.

6. A method in accordance with claim 1, wherein the shown connection terminals of the safety controller are associated with a plurality of units physically separate from one another on the safety controller.

7. A method in accordance with claim 1, further comprising:
printing out or displaying the wiring plan after the preparing of the wiring plan, with each of the connection terminals of the safety controller, encoders and actuators being shown, in each case according to their physical arrangement, including the connections between these connection terminals.

8. A method in accordance with claim 1, wherein an encoder-specific or an actuator specific element description is associated with each encoder and with each actuator in the form of a data set, said element description defining properties of the respective encoder or actuator.

9. A method in accordance with claim 8, wherein a program part is activated in dependence on the element description and evaluates or controls the respective encoder or actuator.

10. A method in accordance with claim 8, wherein parameters are derived from the element description which configure a program part which evaluates the respective encoder or controls the respective actuator.

11. A method in accordance with claim 8, wherein the element descriptions are stored in a programming device; or in that the element descriptions are stored in the associated encoders and actuators from where they are transferred to a programming device for programming purposes.

12. A method in accordance with claim 8, wherein the element description of the encoders includes at least one of the encoder-specific pieces of information named in the following:
Number of the channels to be evaluated;
Demands on the input terminals of the safety controller to be connected;
Type of the evaluation (equivalent/ambivalent);
Test configuration;

Present connection terminals;
Physical arrangement of the connection terminals; and
Encoder marking.

13. A method in accordance with claim 12, wherein information from the Test Configuration lays down how many and which output connection terminal or terminals of the safety controller the encoder has to be wired with.

14. A method in accordance with claim 8, wherein the element description of the actuators includes at least one of the actuator-specific pieces of information named in the following:
Number of the channels to be evaluated;
Demands on the output terminals of the safety controller to be connected;
Type of the control (equivalent/ambivalent);
Present connection terminals;
Physical arrangement of the connection terminals; and
Actuator marking.

15. A method in accordance with claim 1, wherein parameters are associated with activated or configured program parts which correspond to those connection terminals of the safety controller to which the respective encoder or actuator is connected.

16. A method in accordance with claim 1, further comprising the step of forming a data set having a description which defines properties of a respective encoder or actuator associated with at least one safety controller.

17. A method in accordance with claim 16, wherein a configuration of an encoder or of an actuator is carried out on the basis of the element description of a module in dependence on properties of the module.

18. A method in accordance with claim 1, wherein a program tool is deposited in a memory of the safety controller and is loaded into a programming device selected from the group consisting of a PC, a laptop and a handheld, before starting the programming.

* * * * *